US011551037B2

(12) United States Patent
Gavranovic et al.

(10) Patent No.: US 11,551,037 B2
(45) Date of Patent: Jan. 10, 2023

(54) METHOD AND APPARATUS FOR DETERMINING A PHYSICAL SHAPE, METHOD FOR MANUFACTURING A CALCULATION DEVICE, CALCULATION DEVICE, AND USE OF THE CALCULATION DEVICE

(71) Applicant: Siemens Aktiengesellschaft, Munich (DE)

(72) Inventors: Stefan Gavranovic, Putzbrunn (DE); Dirk Hartmann, Aßling (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 859 days.

(21) Appl. No.: 16/388,958

(22) Filed: Apr. 19, 2019

(65) Prior Publication Data
US 2019/0325270 A1    Oct. 24, 2019

(30) Foreign Application Priority Data

Apr. 23, 2018  (EP) .................................... 18168764

(51) Int. Cl.
*G06V 10/75* (2022.01)
*G06K 9/62* (2022.01)
(Continued)

(52) U.S. Cl.
CPC ........... *G06K 9/6257* (2013.01); *G06F 30/20* (2020.01); *G06K 9/6289* (2013.01); *G06N 3/08* (2013.01); *G06V 10/7553* (2022.01)

(58) Field of Classification Search
CPC ...... G06K 9/6257; G06K 9/6289; G06N 3/08; G06V 10/7553; G06F 30/20; G06F 30/17; G06F 2111/06
See application file for complete search history.

(56) References Cited

U.S. PATENT DOCUMENTS

2002/0042663 A1   4/2002  St. Ville
2014/0071165 A1   3/2014  Tuchschmid et al.
2017/0337682 A1   11/2017 Liao et al.

FOREIGN PATENT DOCUMENTS

CN           1523524 A     8/2004
CN         104685551 A     6/2015
(Continued)

OTHER PUBLICATIONS

Lundberg Anton: "Efficient Automatie Vehicle Shape Determination using Neural Networks and Evolutionary Optimization", 2014, pp. 1-53, XP055505922, Gothenburg, Sweden; Gefunden im Internet: URL:http://publications.lib.chalmers.se/records/fulltext/204825/204825.pdf, [gefunden am Sep. 10, 2018], Abstract, sections 4.2, 4.4.2-4.4.4, 4.7-4.8 and 4.10; figures 4.4, 4.8-4.14, the whole document; 2014.

(Continued)

*Primary Examiner* — Carol Wang
(74) *Attorney, Agent, or Firm* — Schmeiser, Olsen & Watts LLP

(57) ABSTRACT

Provided is a method for determining a physical shape having a predefined physical target property that includes calculating a sensitivity landscape on the basis of a shape data record for the physical shape with the aid of a calculation device. The calculation device is a machine-taught artificial intelligence device. The shape data record identifies locations at or on the physical shape. For a plurality of these locations, the sensitivity landscape respectively indicates how the target property of the physical shape changes if the physical shape changes in the region of the location. Furthermore, the shape data record for the physical shape to be determined is changed on the basis of the sensitivity landscape in such a manner that the predefined physical target property is improved.

29 Claims, 7 Drawing Sheets

(51) Int. Cl.
    *G06N 3/08*      (2006.01)
    *G06F 30/20*      (2020.01)

(56) References Cited

FOREIGN PATENT DOCUMENTS

| CN | 107403446 | A |   | 11/2017 |             |
|----|-----------|---|---|---------|-------------|
| CN | 108595797 | A | * | 9/2018  |             |
| JP | 4533601   | B2| * | 9/2010  | G06F 17/5095|

OTHER PUBLICATIONS

Baque Pierre et al: "Geodesic Convolutional Shape Optimization", arxiv.org, Cornell University Library, US .1, pp. 1-11, XP080856391, Gefunden im Internet:URL:https://arxiv.org/pdf/1802.04016.pdf [gefunden am Sep. 10, 2018], Abstract, Optimierung einer Fahrzeugsform; figure 1, section 3 ("Regression of physical quantities"); pp. 3, left column, figure 3: Geometrisches CNN; section 3.2: Architektur des Regressors, section 4: Formoptimierung; pp. 4-5, Computerimplementierung (TensorFlow und Titan X GPU); pp. 6, left column, lines 19-21, section 5.1 and 5.2: Optimierung von 2-D und 3-D Formen; figures 5, 9, the whole document; 2018.

Othmer 2014 ,,Adjoint methods for car aerodynamics, Journal of Mathematics in Industry, Springer, 2014, 4:6.

European Search Report for application No. 18168764.1 dated Sep. 19, 2018.

Song, K.S., et al., "Aerodynamic design optimization of rear body shapes of a sedan for drag reduction," International Journal of Automotive Technology; The Korean Society of Automotive Engineers; Heidelberg; vol. 13, No. 6, Oct. 2, 2012; pp. 905-914; XP035120064; 10 pages.

Examination Report in corresponding European Patent Application No. 18 168 764.1 dated Jan. 21, 2021. 9 pages.

\* cited by examiner

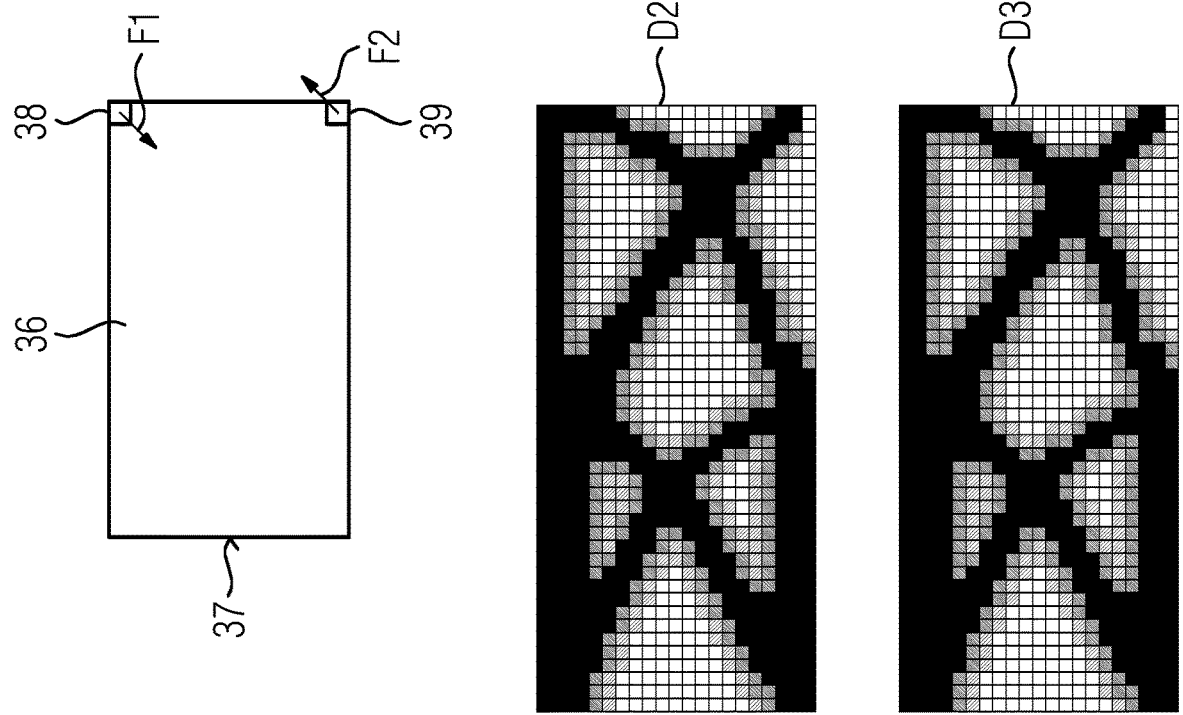
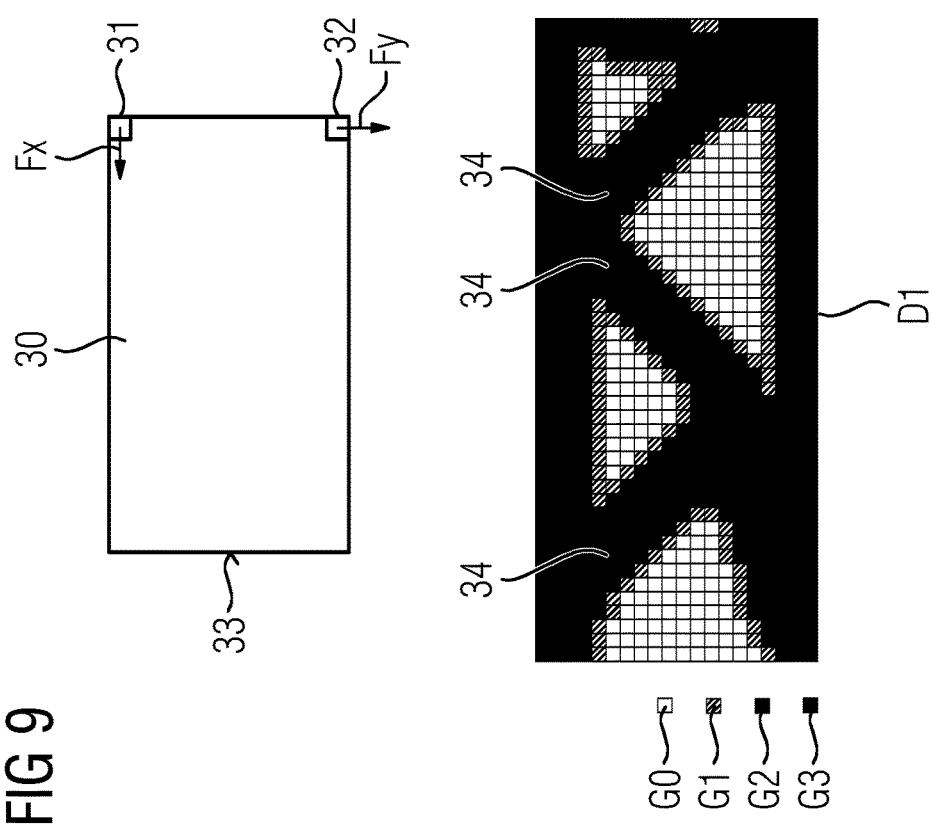
FIG 9

METHOD AND APPARATUS FOR DETERMINING A PHYSICAL SHAPE, METHOD FOR MANUFACTURING A CALCULATION DEVICE, CALCULATION DEVICE, AND USE OF THE CALCULATION DEVICE

CROSS-REFERENCE TO RELATED APPLICATIONS

This application claims priority to European application No. 18168764.1, having a filing date of Apr. 23, 2018, the entire contents of which are hereby incorporated by reference.

FIELD OF TECHNOLOGY

The present embodiments of the invention relate to a method for determining a physical shape having a predefined physical target property, to a method for manufacturing a calculation device for calculating a sensitivity landscape, to a calculation device, to a use of the calculation device, and to an apparatus for determining a physical shape having a predefined physical target property.

BACKGROUND

When manufacturing physical objects, it is sometimes necessary to optimize their shape with respect to a physical property. For example, when manufacturing motor vehicles, it is necessary to optimize their outer shape with respect to the flow resistance, with the result that it is possible to determine an outer motor vehicle shape which has an optimum flow property.

Othmer 2014 ("Adjoint methods for car aerodynamics", Journal of Mathematics in Industry, Springer, 2014, 4:6) describes gradient-based optimization in computational fluid dynamics (CFD) and a calculation of so-called sensitivity maps which is based thereon.

However, the calculation of gradient-based sensitivity maps is computationally intensive. Their use when determining physical shapes, in particular in manufacturing processes, means a large outlay in terms of time and costs. This may result in high manufacturing costs and long design phases and may hinder interactive design.

SUMMARY

Against this background, embodiments of the invention provide improved methods and apparatuses for determining a physical shape having a predefined physical target property. Another aspect of the embodiments of the invention is to provide a method for manufacturing a calculation device for calculating a sensitivity landscape. Another aspect of the embodiments of the invention is to provide an apparatus for determining a physical shape having a predefined physical target property, which apparatus can be used to calculate gradient-based sensitivity landscapes.

Accordingly, a method for determining a physical shape having a predefined physical target property is provided. The method comprises:

providing a physical model and capturing shape data for the physical model and/or providing shape data of a physical model for the purpose of respectively creating a shape data record which identifies locations at or on a physical shape which corresponds to the shape data.

The method also comprises: capturing the target property for the physical shape which corresponds to the shape data record.

The method also comprises: determining sensitivity values for a plurality of locations at or on the physical shape on the basis of the shape data record for the purpose of generating a sensitivity landscape for the respective shape data record. For a location at or on the physical shape, a sensitivity value indicates a degree of change for the change in the target property of the physical shape if the physical shape changes in the region of the location as a result of a change in the shape data record.

The method also comprises: using a machine learning method to produce a calculation device which assigns a sensitivity landscape to a respective shape data record. The machine learning is carried out on the basis of a plurality of shape data records and the target properties and/or sensitivity values captured for this purpose.

The method also comprises: calculating a sensitivity landscape on the basis of a shape data record for a physical shape to be determined with the aid of the calculation device.

The method also comprises: changing the shape data record for the physical shape to be determined on the basis of the calculated sensitivity landscape in such a manner that the predefined physical target property changes in the direction of a predetermined value.

Using the machine learning method to produce a machine-taught calculation device and calculating a sensitivity landscape for a physical shape to be determined with the aid of this calculation device make it possible to determine a physical shape having a predefined physical target property without a computationally intensive simulation method.

A physical shape having a predefined physical target property can therefore be determined with less computational effort and therefore in a faster and more cost-effective manner. It is thus possible for the user of the method to quickly (for example also interactively) react to the results of the calculation device.

The predefined physical target property is, in particular, a physical property or a physical variable or a physical function of the physical shape, the value of which is changed, in particular improved or optimized, by the method in the direction of a predetermined value, for example a minimum value or a maximum value. A flow resistance, a strength, a temperature, a reflection property at the surface, a weight, a conductivity, a heat transfer coefficient, a cooling property and/or sound absorption of a surface structure is/are possible, in particular, as a physical property.

The physical model may be a concrete physical model, for example a so-called clay model. In this case, shape data of the concrete physical model are captured, as subsequently described. Alternatively or additionally, a digital physical model, which is present and/or is provided in the form of shape data, can be used as the physical model. A digital physical model is, for example, a computer-aided-design model (CAD model). Further examples of digital physical models provided as shape data are subsequently described.

The physical shape is a geometrical shape of the physical model. The physical shape is, for example, a two-dimensional or three-dimensional geometrical shape of the physical model. For example, the physical shape may be an external vehicle shape.

The shape data are data which describe the physical shape in an abstract manner. The shape data are, in particular, data which describe the physical shape in a digital or mathematical manner. The shape data are digital values and/or details which can be digitally formulated and identify the physical shape.

The shape data record identifies locations at or on the physical shape which is identified by the shape data, as described. For example, the shape data record is a set of location coordinates.

A sensitivity value for a (particular) location at or on the physical shape is a degree of change or a gradient which, for this location, indicates how the target property of the physical shape changes if the physical shape is changed in a normal direction in the region of this location. The sensitivity value for this location at or on the physical shape therefore indicates how sensitively the physical target property would react to a change in the physical shape at this location. For example, a sensitivity value for a location at or on the physical shape is an absolute value, in particular an absolute value and a sign, along a normal vector at this location.

The sensitivity landscape comprises a shape data record, which identifies a plurality of locations at or on the physical shape, and sensitivity values which are associated with these locations and indicate how the physical shape would have to be changed in a normal direction at these locations in order to optimize the target property.

Changing the shape data record for the physical shape to be determined on the basis of the calculated sensitivity landscape means changing the physical shape identified by the shape data.

Machine learning or artificial intelligence (AI) is the ability of computer-aided systems to use methods and solve problems which, when solved by a person, require intelligence.

The use of the machine learning method to produce a calculation device or artificial intelligence can be effected with the aid of a machine learning algorithm. In this case, an artificial system (the calculation device) is taught from sample data, so-called learning data records which are fed into the calculation device, with the aid of an algorithm, with the result that the system can assess even unknown input data after being taught.

The learning data records comprise, in particular, shape data records and associated sensitivity landscapes. The machine learning is carried out, for example, by recognizing similarities and patterns in the plurality of learning data records, sorting the learning data records into categories according to the recognized similarities and patterns and generalizing the categories in order to be able to make predictions for unknown input data records.

For example, a first learning data record comprises a first shape data record for a particular first vehicle shape and the associated sensitivity landscape. For example, a second learning data record comprises a second shape data record for a particular second vehicle shape, which differs from the first vehicle shape, and the sensitivity landscapes belonging to the second vehicle shape. During the machine teaching with the aid of these two exemplary learning data records, the calculation device can recognize patterns which infer that particular shapes have particularly small sensitivity values and particular shapes have particularly large positive or negative sensitivity values in each case. The calculation device can therefore generate an artificial shape data record and an associated artificial sensitivity landscape for a third vehicle shape which has not been fed into the calculation device and which consequently enhances the input first shape data record with the associated sensitivity landscape and the input second shape data record with the associated sensitivity landscape. After this exemplary teaching, the calculation device can therefore also calculate a sensitivity landscape for a physical shape which corresponds to the third shape data record.

A machine learning algorithm can be implemented, for example, with the aid of decision trees, mathematical functions, general programming languages, neural networks, in particular, convolutional neural networks (CNN), the nearest-neighbor method, Bayesian networks and/or linear regression. The machine learning algorithm may be designed, for example, for monitored learning and/or unmonitored learning. The machine learning algorithm may be designed, for example, for deep learning and/or for reinforcement learning and/or for marginal space learning.

In embodiments, the physical shape comprises a volume, a two-dimensional geometrical shape, a three-dimensional geometrical shape, a vehicle shape, a shape of a structural element, a shape of a fastening element and/or a three-dimensional shape of a surface structure.

For example, the physical shape may be an external vehicle shape, a holder, a structure and/or a plate for fastening a load, a cooling structure or a heat sink or a noise insulation wall covering.

Appropriate different physical shapes can be changed with respect to a respective predefined physical target property using the method.

For example, an external vehicle shape can be changed in such a manner that it has a minimum flow resistance. For example, a holder, a structure and/or a plate can be changed in such a manner that it/they has/have a minimum weight or volume in order to support a predefined load. For example, a three-dimensional shape of a fastening element can be changed in such a manner that its structural strength is maximized for a predefined load and material expenditure. For example, a cooling structure, for example a heat sink, can be changed in such a manner that its heat dissipation ability is maximized. For example, the three-dimensional surface structure of a noise insulation wall covering can be changed in such a manner that it has maximum sound absorption.

For example, a physical shape which is a two-dimensional geometrical shape can be changed with respect to a minimum or maximum reflection property of a surface.

In embodiments, the process of capturing the shape data for the physical model comprises: scanning with the aid of a scanning device, in particular with the aid of cameras, laser beams, radar waves and/or ultrasonic waves.

For example, the shape data for the physical model can be captured by recording the physical model using stereo cameras which have a plurality of lenses. The shape data for the physical model can also be captured with the aid of a laser triangulation method. In a laser triangulation method, the physical model is irradiated with laser radiation and the laser light reflected by the physical model is captured using a receiving unit. The distance to the physical model can be calculated from the angle at which the reflected light is incident on the receiving unit. Three-dimensional shape data of the physical model can be captured by scanning the entire physical model by means of this method.

In another embodiment, the shape data for the physical model can be captured by means of a time-of-flight measurement using ultrasound, for example. During the time-of-flight measurement, (ultrasound) radiation is emitted by a radiation source and is reflected by the physical model, the reflected radiation is captured by a receiving unit and the time needed by the radiation to cover the distance from the radiation source to the physical model and to the receiving unit is measured.

In embodiments, the shape data have: computer-aided-design data (CAD data), surface shape data, standard shape data, ruled surface data, grid data, grid structure data, data relating to parameterized free-form surfaces and/or facet data.

A use of parameterized free-form surfaces allows physical tangible models to be dispensed with because the target property can be effected by simulating the parameterized free-form surfaces, instead of by means of a physical measurement.

In embodiments, the process of capturing the target property comprises: measuring the target property, in particular measuring a flow resistance in a wind tunnel, measuring a structural strength, a temperature, a reflection property at the surface, a weight, a conductivity and/or sound absorption of a surface structure.

For a physical model which is provided as a concrete physical model in particular, the process of capturing the target property may comprise measuring the target property, for example in a laboratory experiment. For example, for a concrete physical model of a vehicle shape, the flow resistance of the external vehicle shape can be measured in a wind tunnel. For example, for a concrete physical model of a holder, a structure and/or a plate for fastening a load, the structural strength thereof with respect to supporting the load can be measured in a laboratory experiment. For example, for a concrete physical model of a noise insulation wall covering, its sound absorption can be measured in an acoustics laboratory.

In embodiments, the process of capturing the target property comprises a simulation method for simulating the target property on the basis of the shape data record.

Capturing the target property by means of a simulation method allows physical tangible models and therefore the production of physical tangible models to be dispensed with.

For example, for a shape data record which corresponds to a physical model of a vehicle, the flow resistance of the external vehicle shape can be captured in a numerical flow simulation. As a result of the target property being captured in a simulation, the target property can be captured in a more efficient and more cost-effective manner and in a shorter time than in a laboratory experiment.

In embodiments, the process of capturing the target property is carried out taking into account captured boundary conditions, wherein the boundary conditions stipulate ranges of values for which the target property is measured and/or simulated, and wherein the boundary conditions comprise, in particular, a wind direction, a wind strength, a wind tunnel configuration, a weight, a force, a structural strength, a sound frequency and/or a sound power.

The practice of taking boundary conditions into account when capturing the target property makes it possible to stipulate desired ranges of values which indicate the field of use of the physical shape to be determined.

For example, the flow resistance of an external vehicle shape can be captured taking into account the boundary condition of a particular wind direction (in particular a range of values of wind directions) and the boundary condition of a particular wind strength (in particular a range of values of a wind strength).

Both the process of capturing the target property by measuring the target property and the process of capturing the target property by means of a simulation method for simulating the target property can be carried out taking into account boundary conditions.

When measuring the target property, the process of capturing the boundary conditions may involve setting the boundary conditions in laboratory equipment, for example.

In the case of a simulation method for simulating the target property, the process of capturing the boundary conditions may involve inputting the boundary conditions to a simulation unit as parameters of the simulation method, for example.

In embodiments, the simulation method comprises: a mathematical simulation method, a numerical simulation method, a space discretization method, a surface discretization method, a finite elements method, a finite differences method, a finite volume method, a particle-based method, a computational continuum mechanics method and/or a computational fluid dynamics method.

In embodiments, each shape data record is assigned the target property captured for this purpose and/or the sensitivity values captured for this purpose in order to generate a respective learning data record.

Such generation of learning data records allows these learning data records to be fed into the calculation device and to be used for the machine teaching of the calculation device.

In embodiments, the method also comprises generating and storing a plurality of learning data records.

The calculation device can be taught better by generating a plurality of learning data records. As a result of the plurality of learning data records being stored, they can also be evaluated at a later time by the calculation device.

In embodiments, a sensitivity value for a location data record defining a predetermined location indicates a degree of change for the change in the target property if the physical shape changes in a normal direction at the predetermined location.

As a result of the sensitivity value which indicates, for a predetermined location, a degree of change for the change in the target property if the physical shape changes in a normal direction at the predetermined location, it is possible to indicate, to the user of the method, the information relating to how the physical shape can be advantageously changed at the predetermined location in the form of a value, for example a color-coded value. In this case, an advantageous change in the physical shape is a change in the physical shape such that the predefined physical target property changes in the direction of a predetermined value.

In embodiments, the respective sensitivity landscape comprises a shape data record and a degree of change for the change in the target property of the physical shape if the physical shape changes in a respective normal direction at a plurality of the locations at or on the physical shape, which are identified by the shape data record, as a result of a change in the shape data record.

In embodiments, the process of using a machine learning method comprises teaching/training a neural network, in particular a convolutional neural network, with the aid of a plurality of learning data records which have been generated.

Complex, non-linear relationships between learning data records can be learnt by using a machine learning method with the aid of an artificial neural network, in particular a convolutional neural network (CNN).

In embodiments, the following steps are repeatedly carried out in succession: changing the shape data record for the physical shape to be determined, and calculating a sensitivity landscape on the basis of the shape data record with the aid of the calculation device for the purpose of changing the physical shape.

By repeatedly carrying out the steps mentioned, the shape data record for the physical shape to be determined can be gradually changed in such a manner that the predefined physical target property changes to an increasing extent in the direction of a predetermined value.

In embodiments, the calculation device comprises an assignment table which assigns a respective sensitivity landscape to a plurality of shape data records.

In embodiments, the method also comprises displaying the sensitivity landscape on the basis of the shape data record.

As a result of the sensitivity landscape being displayed on the basis of the shape data record, the user of the method is provided with (direct) information, for a plurality of locations on or at the physical shape which are identified by the shape data record, relating to how the shape data record can be changed in a respective normal direction in the region of these locations in order to change the predefined physical target property of the physical shape in the direction of a predetermined value.

As a result, for the plurality of locations at or on the physical shape, the user of the method is provided with information which is directly related to the respective locations and relates to whether and, if so, in what direction and to what extent the physical shape can be advantageously changed at the predetermined location. For example, it is possible to indicate, to the user of the method, the information relating to how the physical shape can be advantageously changed at the predetermined location in the form of a color-coded value. For example, the user can interactively change the shape data record for the physical shape by means of the information received.

In embodiments, the display comprises spatially displaying the sensitivity landscape on the basis of the shape data record on the physical model and/or displaying the sensitivity landscape on the basis of the shape data record in such a manner that the sensitivity landscape is displayed together with the shape data record.

As a result, in the case of a concrete physical model (for example a clay model) and in the case of a digital model (for example a CAD model), the user can immediately discern the information relating to how the physical shape can be advantageously changed from the physical model.

In embodiments, the method comprises producing a physical shape having the predefined physical target property according to the shape data record which has been changed on the basis of the calculated sensitivity landscape.

Producing the physical shape according to the changed shape data record means that the change in the shape data record and therefore in the physical shape can be easily rendered objectively and haptically perceivable, for example in order to produce a presentation object and/or a prototype.

In embodiments, the process of producing a physical shape comprises an additive manufacturing method, in particular a manufacturing method with the aid of a strand of quick-setting compound.

As a result, a concrete model of the physical shape can be manufactured automatically, quickly and even by an untrained person on the basis of the changed shape data record.

Another aspect provides a method for manufacturing a calculation device for calculating a sensitivity landscape from a shape data record. The method comprises: providing a basic artificial intelligence (AI) device which is a device with artificial intelligence based on machine learning and which maps an input data record to an output data record. The method also comprises: providing a shape data record and associated sensitivity values, wherein the shape data record and the associated sensitivity values together form a learning data record. The shape data record identifies locations at or on a physical shape. The sensitivity values indicate, for a plurality of locations at or on the physical shape, a degree of change for the change in a physical target property of the physical shape if the physical shape changes in the region of the location as a result of a change in the shape data record. The sensitivity landscape comprises the sensitivity values assigned to the locations in the shape data record. The method also comprises: providing further different learning data records. The method also comprises: subjecting the basic AI device to machine teaching with the aid of the learning data records in order to generate a taught AI device as the calculation device.

The basic artificial intelligence (AI) device is a device with artificial intelligence based on machine learning. A taught AI device is produced as the calculation device from the basic AI device provided by means of the manufacturing method, in particular by means of machine teaching. The machine learning is carried out, for example, with the aid of decision trees and/or neural networks, in particular convolutional neural networks.

It can be stated that the AI device is a device which processes input data, in particular shape data, according to a taught algorithm as a result of training with training data and outputs output data, in particular sensitivity landscapes.

It is conceivable for the taught AI device to comprise configuration data, for example topology information and weight values for nodes of a neural network, which characterize the properties with respect to the input and output data of the AI device. In this respect, the proposed methods could comprise the step of: storing configuration data of the AI device.

In embodiments, the manufacturing method and/or the method for determining a shape comprise(s) the step of: setting up or configuring a basic AI device using stored configuration data for the purpose of providing a calculation device.

Aspects and embodiments of the calculation device and of the machine learning which have been described with respect to the method for determining a physical shape having a predefined physical target property also apply to the method for manufacturing a calculation device.

The input data record is a shape data record which is mapped to a sensitivity landscape as an output data record.

In embodiments, the physical target property is a flow resistance, a strength, a temperature, a reflection property at the surface, a weight, a conductivity, a cooling property and/or sound absorption of a surface structure.

In embodiments, the respective shape data record comprises the plurality of locations on or at the surface of the physical shape in the form of location data records.

In embodiments, the calculation device comprises a neural network, in particular a convolutional neural network.

In embodiments, the calculation device is set up to carry out pattern recognition on shape data records and to output sensitivity values and/or a sensitivity landscape.

Pattern recognition can be carried out on a plurality of shape data records, in particular on a plurality of learning data records. In this case, regularities, repetitions and/or similarities can be recognized in the plurality of learning data records, for example, in order to be able to make predictions for unknown input data records. A sensitivity landscape can therefore also be calculated for shape data records which are not provided during teaching with the aid of the taught AI device as the calculation device.

In embodiments, a calculation device is provided.

A use of the calculation device for calculating a sensitivity landscape from a shape data record is also proposed, wherein the sensitivity landscape is provided for the purpose of adapting a physical shape to be determined in such a manner that the predefined physical target property changes in the direction of a predetermined value.

Aspects and embodiments of the calculation device using machine learning which have been described with respect to the method for determining a physical shape having a predefined physical target property also apply to the calculation unit and to the use of the calculation unit.

Another aspect provides an apparatus for determining a physical shape having a predefined physical target property.

The apparatus has a capture device for generating a shape data record for a physical shape, which data record identifies locations at or on the physical shape.

The apparatus has a calculation device for calculating a sensitivity landscape from the shape data record.

The sensitivity landscape comprises the shape data record and a degree of change for the change in the target property of the physical shape if the physical shape changes in a respective normal direction at a plurality of the locations at or on the physical shape which are identified by the shape data record.

The calculation device is an artificial intelligence apparatus which is taught on the basis of machine learning and maps a shape data record as an input data record to a sensitivity landscape as an output data record.

The machine learning is carried out on the basis of a plurality of learning data records.

Each learning data record comprises a learning shape data record for a learning physical shape and a learning sensitivity landscape as a degree of change for the change in the target property of the learning physical shape if the learning physical shape changes in a respective normal direction at a plurality of the locations at or on the learning physical shape which are identified by the learning shape data record.

The apparatus has a display device for displaying the sensitivity landscape on the basis of the shape data record.

In embodiments, the display device is a screen of an augmented reality device, in particular glasses, a headset, a tablet, a portable computer and/or a mobile telephone. The display device may also be a screen of a virtual reality device or may be a simple projector.

An augmented reality device is understood as meaning, in particular, a device which enhances a display of information for the user in a computer-aided manner. The display of information may be the display of the sensitivity landscape on the basis of the shape data record. The computer-aided enhancement may be a display of the sensitivity landscape on the basis of the shape data record together with the shape data record.

In the case of a concrete physical model (for example a clay model), the enhanced display of the sensitivity landscape in a computer-aided manner on the basis of the shape data record can be presented in the augmented reality device in such a manner that it appears to the user as having been projected onto the concrete physical model. A presentation in a virtual reality device or a simple projection using a projector is also conceivable.

In the case of a digital model (for example a CAD model), the enhanced display of the sensitivity landscape in a computer-aided manner on the basis of the shape data record and the display of the shape data record can be presented in the augmented reality device in such a manner that the sensitivity landscape appears to the user as having been projected onto the digital physical model.

In embodiments, the apparatus has a scanning device similar to the scanning device described with respect to the two methods.

The capture device is a computer-aided capture device, in particular. In the case of a concrete physical model, the capture device can be set up to receive the scanning data captured by the scanning device and to convert them into shape data. In the case of a digitized physical model, the capture device may be set up to capture the digital shape data.

Further aspects and embodiments which have been described with respect to the two methods also apply to the apparatus for determining a physical shape having a predefined physical target property.

In embodiments, the apparatus also has a storage device for storing the calculated sensitivity landscape on the basis of the shape data record.

Aspects and embodiments which have been described with respect to the storage of a plurality of learning data records also apply to the storage device for storing the calculated sensitivity landscape on the basis of the shape data record.

In embodiments, the apparatus also has a production apparatus for producing a physical shape having the predefined target property, in particular a production apparatus for additive manufacturing with the aid of a strand of quick-setting compound.

Aspects and embodiments which have been described with respect to the production of a physical shape having the predefined physical target property according to the shape data record changed on the basis of the calculated sensitivity landscape also apply to the production apparatus for producing a physical shape having the predefined target property.

In embodiments, the apparatus has a computing apparatus. The computing apparatus may have the calculation device, the capture device, the simulation unit and/or the storage device.

The embodiments and features described for the proposed methods accordingly apply to the proposed apparatus.

The respective unit, for example the computing apparatus, calculation device, capture device, simulation unit, the storage device and/or the control unit, can be implemented using hardware and/or software. In the case of a hardware implementation, the respective unit may be designed as an apparatus or as part of an apparatus, for example as a computer or as a microprocessor or as a control computer of a vehicle. In the case of a software implementation, the respective unit may be designed as a computer program product (non-transitory computer readable storage medium having instructions, which when executed by a processor, perform actions), as a function, as a routine, as part of a program code or as an executable object.

A computer program product is also proposed and causes the method explained above and below to be carried out on a program-controlled device. In this respect, the methods are carried out, in particular, as computer-implemented methods.

A computer program product, for example a computer program means, may be provided or delivered, for example, as a storage medium, for example a memory card, a USB stick, a CD-ROM, a DVD or else in the form of a downloadable file from a server in a network. This can be carried out in a wireless communication network, for example, by transmitting a corresponding file containing the computer program product or the computer program means. An implementation of the computer program product as a software service, in particular distributed storage means such as cloud services, is also conceivable.

Further possible implementations of the embodiments of the invention also comprise not explicitly mentioned combinations of features or embodiments described above or below with respect to the exemplary embodiments. In this case, a person skilled in the art will also add individual aspects as improvements or additions to the respective basic form of the embodiments of the invention.

BRIEF DESCRIPTION

Some of the embodiments will be described in detail, with references to the following Figures, wherein like designations denote like members, wherein:

FIG. 9 shows an example of a calculation of a sensitivity landscape from a shape data record with the aid of a taught calculation device.

DETAILED DESCRIPTION

In the figures, identical or functionally identical elements have been provided with same reference signs unless indicated otherwise.

Figure 1:
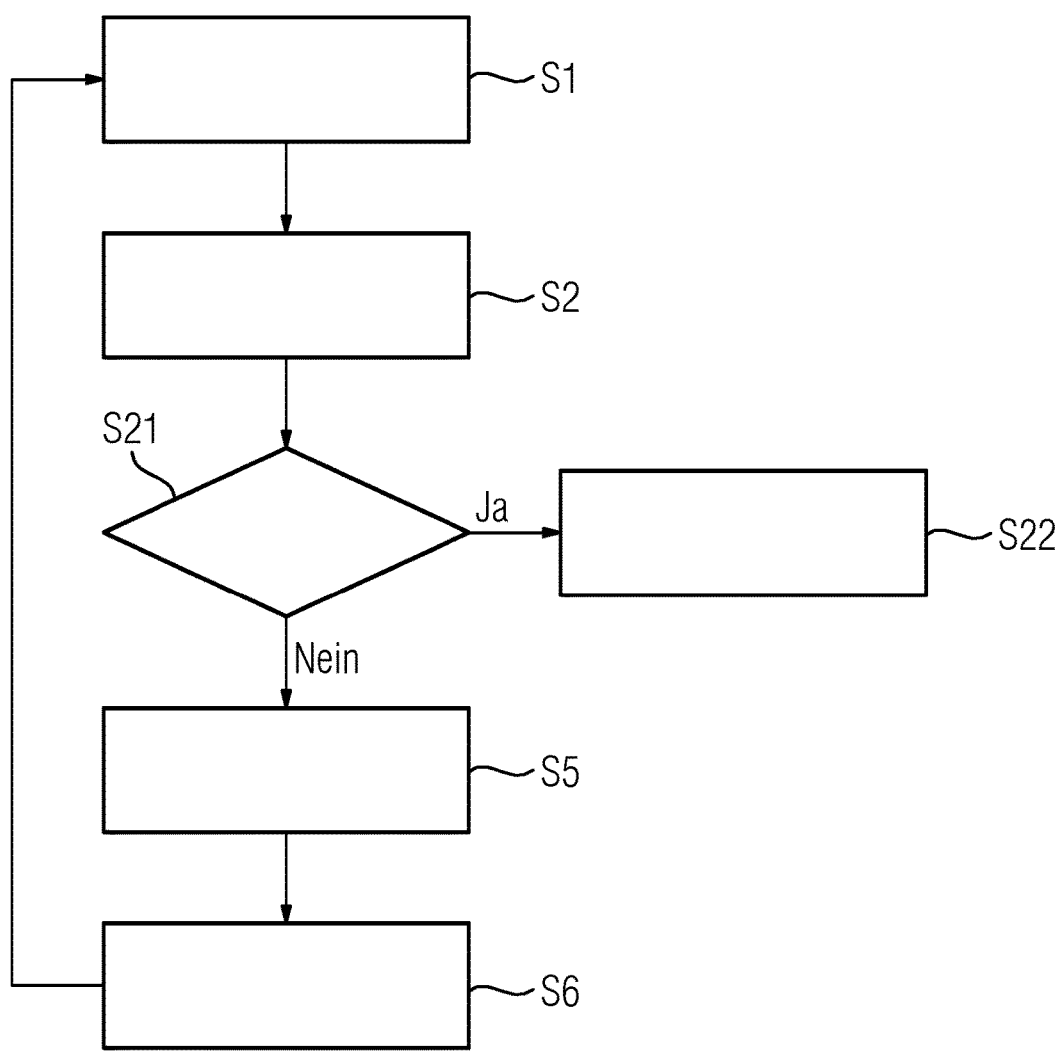
FIG. 1 shows a flowchart for an embodiment of a method for determining a physical shape having a predefined physical target property.

FIG. 1 shows a flowchart for an embodiment of a method for determining a physical shape having a predefined physical target property.

In the first step S1 of the method, a shape data record is created from shape data of a physical model. The shape data record therefore identifies locations at or on a physical shape which corresponds to the shape data.

In order to determine a physical shape having a predefined physical target property, a physical shape is first of all provided as a starting point for the method. The physical shape for the method can be provided by providing a concrete physical model (for example a clay model) or a digitized physical model (for example a CAD model).

Shape data are then captured for the physical shape which has been provided. Shape data are data which describe the physical shape in an abstract manner. The shape data are, in particular, data which describe the physical shape in a digital or mathematical manner.

In step S1 of the method, a shape data record is then created for the physical shape. The shape data record identifies, for example, locations at or on the surface of the physical shape. The shape data record comprises the plurality of locations on or at the physical shape, for example in the form of location data records. The location data records are location coordinates, for example.

Figure 6:
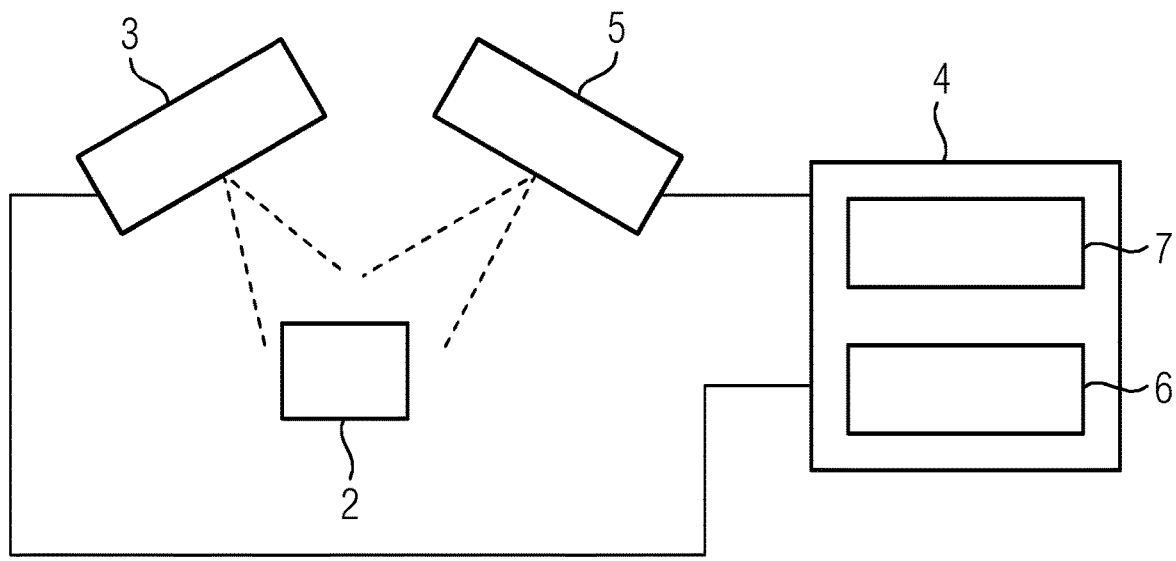
FIG. 6 shows a schematic illustration of an embodiment of an apparatus for determining a physical shape having a predefined physical target property.

The method from FIG. 1 may be carried out, for example, by an apparatus, as shown in FIG. 6. FIG. 6 illustrates an embodiment of an apparatus for determining a physical shape 1 having a predefined physical target property. The apparatus in FIG. 6 has a concrete physical model 2 of the physical shape 1. It also has a scanning device 3 for capturing the shape data of the physical shape in step S1 of the method from FIG. 1. The scanning device 3 is, for example, a 3-D scanner for three-dimensionally scanning the physical model 2. The 3-D scanner 3 is connected to a computing apparatus 4 in a wireless or wired manner in order to transmit the scanning data captured by the 3-D scanner to the computing apparatus 4. The computing apparatus 4 has a capture device 6 which receives the scanning data of the physical model 2 which are transmitted by the scanning device 3 and uses said data to generate a shape data record for the physical shape 1 corresponding to the physical model 2. The computing apparatus 4 also has a machine-taught calculation device 7 as an AI device for calculating a sensitivity landscape on the basis of the shape data record. The apparatus in FIG. 6 also has a display device 5. The display device 5 may be, for example, a projector or a screen of an augmented reality device.

Figure 7:
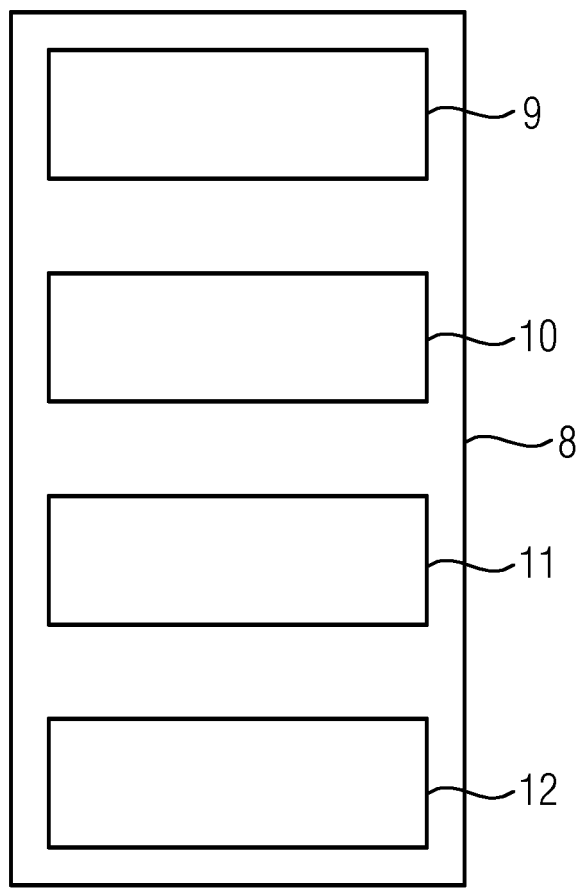
FIG. 7 shows an exemplary embodiment of the computing apparatus from FIG. 6.

Another exemplary embodiment of the computing apparatus from FIG. 6 is shown in FIG. 7. The computing apparatus 8 in FIG. 7 has: a machine-taught calculation unit 9 similar to the calculation unit 7 from FIG. 6; a capture device 10 similar to the capture device 6 from FIG. 6; a simulation unit 11 for carrying out a simulation method for capturing the target property, and a storage device 12 for storing the calculated sensitivity landscape on the basis of the shape data record.

Figure 8:
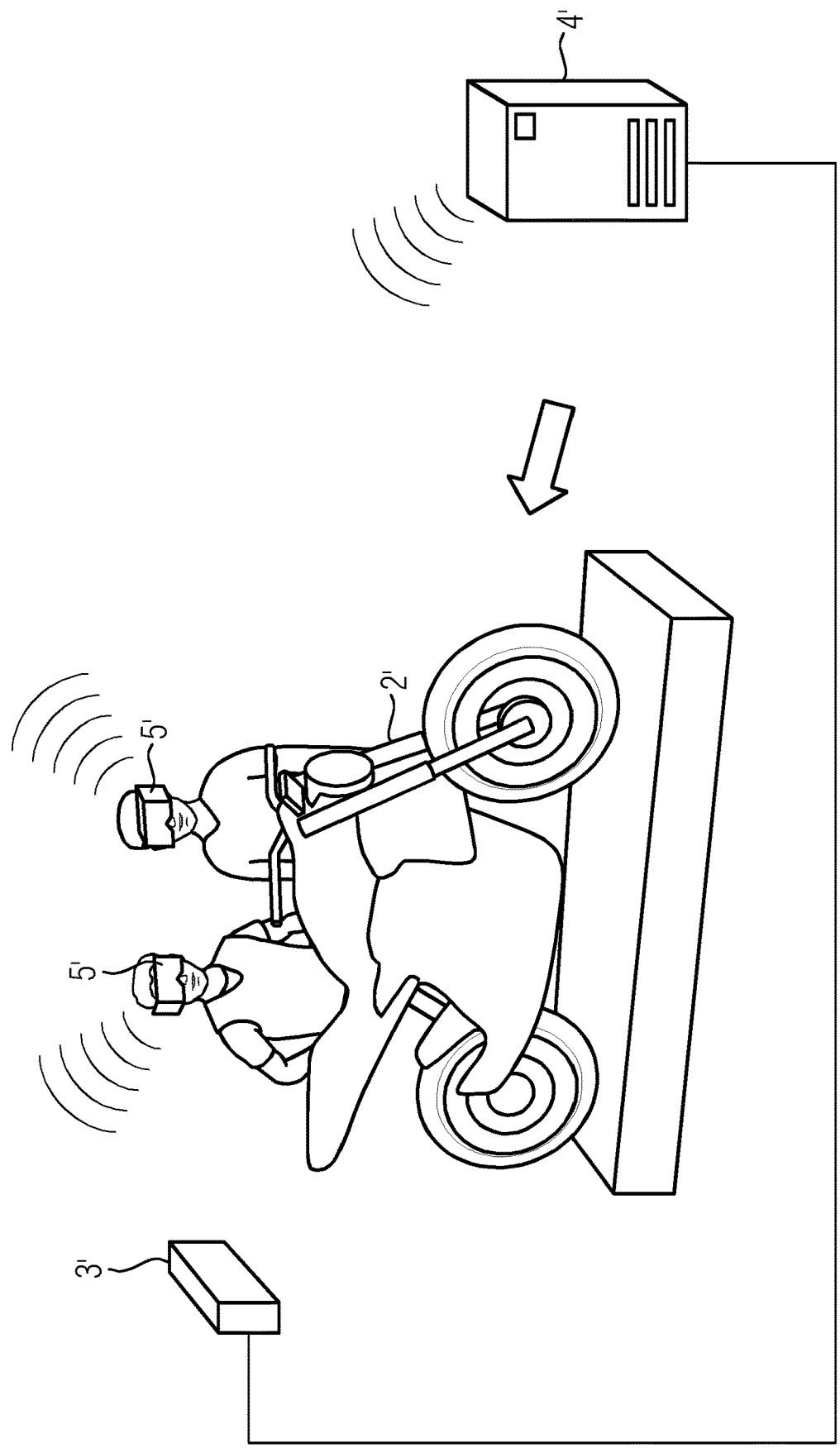
FIG. 8 shows another exemplary embodiment of an apparatus for determining a physical shape having a predefined physical target property.

Another example of an apparatus which can be used to carry out the method from FIG. 1 is shown in FIG. 8. The exemplary embodiment of an apparatus shown in FIG. 8 can be used to determine an external vehicle shape of a motorcycle having a minimum flow resistance in an improved manner with the aid of surface sensitivity maps. In this example, the physical shape is the external vehicle shape of the motorcycle and the predefined physical target property is the flow resistance. The surface sensitivity maps are calculated with the aid of a machine-taught system.

FIG. 8 shows a physical model 2' of a motorcycle. The apparatus in FIG. 8 also has a wind tunnel (not shown) in which the motorcycle model 2' is situated. FIG. 8 also shows a 3-D scanner 3' as a scanning device for three-dimensionally scanning the external motorcycle shape for the purpose of capturing the shape data. The 3-D scanner 3' is connected to a computing apparatus 4' in a wireless or wired manner in order to transmit scanning data captured by the 3-D scanner to the computing apparatus 4'. The computing apparatus 4' is configured like the computing apparatus 8 from FIG. 7, for example. The computing apparatus 4' has, for example, a capture device 10 which receives the scanning data of the motorcycle model 2' transmitted by the scanning device 3' and uses said data to generate a shape data record which corresponds to the external shape of the motorcycle model 2'. The computing apparatus 4' also has a machine-taught calculation device 9' as an AI device for calculating a sensitivity landscape on the basis of the shape data record.

The apparatus from FIG. 8 also has a display device 5'. The display device 5' has a plurality of screens of augmented reality glasses.

In this example of the method, which is carried out by the apparatus from FIG. 8, a concrete physical model 2' of a motorcycle, for example a clay model of a motorcycle, is first of all provided in step S1. Shape data are captured for this motorcycle model 2' in step S1. Shape data are surface shape data in this example. The surface shape data for the motorcycle model 2' are captured by scanning the motorcycle model 2' with the aid of the 3-D scanner 3' as the scanning device. The 3-D scanner 3' transmits the scanning data captured by the 3-D scanner 3' to the computing apparatus 4' in a wireless or wired manner. The computing apparatus 4' captures surface shape data of the motorcycle model 2' on the basis of the scanning data. In particular, the computing apparatus 4' has a capture device 10' which receives the scanning data from the 3-D scanner 3' and creates surface shape data of the motorcycle model 2' on the basis of the scanning data.

The computing apparatus 4' generates a shape data record for the motorcycle model 2' on the basis of the captured surface shape data. The shape data record identifies a plurality of locations on the surface of the external vehicle shape in the form of location vectors.

In the second step S2 of the method, a target property for the physical shape which corresponds to the shape data record created is captured. The target property is a physical property or a physical variable or a physical function of the physical shape, the value of which is intended to be changed, in particular improved or optimized, by means of the method in the direction of a predetermined value, for example a minimum value or a maximum value. The target property can be captured with the aid of a measurement (for example in the laboratory, in a wind tunnel) and/or a simulation method.

In the example of determining an external motorcycle shape, the target property is the flow resistance of the external vehicle shape of the motorcycle model 2'. The flow resistance of the external motorcycle shape is captured in the example by measuring the flow resistance in the wind tunnel.

The target property can be captured taking into account captured boundary conditions. The boundary conditions stipulate ranges of values for which the target property is measured and/or simulated. As a result, it is possible to stipulate ranges of values for which the physical shape having a predefined physical target property is determined by the method.

When measuring the target property, the process of capturing the boundary conditions may involve setting the boundary conditions in laboratory equipment, for example. In the case of a simulation method for simulating the target property, the process of capturing the boundary conditions may involve inputting the boundary conditions to a simulation unit as parameters of the simulation method, for example.

In the example of determining the motorcycle shape, the flow resistance of the external motorcycle shape is measured in the wind tunnel. In this case, the flow resistance is measured taking into account the boundary condition that the wind in the wind tunnel comes "from the front", that is to say is directed frontally in the direction of the motorcycle (indicated by an arrow in FIG. 8). A further boundary condition when measuring the flow resistance is the wind strength, which comprises a wind strength range typical of the driving of a motorcycle, and the wind tunnel configuration, in particular the geometrical shape of the wind tunnel. The wind direction, the wind strength range and/or the wind tunnel configuration can be preset in the wind tunnel laboratory, for example. However, the wind direction, the wind strength range and/or the wind tunnel configuration can also be input by a user of the method, for example interactively. The input by the user can be effected, for example, with the aid of an input unit of a computer, in particular a touchscreen, a keyboard and/or a mouse, or a camera, in particular for gesture recognition.

The subsequent step S21 checks whether the captured target property has reached a predetermined value for the target property, for example a minimum value of a flow resistance.

If the captured target property has reached a predetermined value for the target property in step S21, the shape data record created for the physical shape is output in step S22. The physical shape determined by the shape data record which has been output can then be produced as a prototype, for example. The method for determining a physical shape having a predefined target property is concluded.

In the example of determining the motorcycle shape, step S21 checks whether the flow resistance measured in the wind tunnel has reached a predetermined minimum value for the flow resistance. If the predetermined minimum value for the flow resistance of the external motorcycle shape has been reached, the shape data record created for the external motorcycle shape is output in step S22 in the form of the location vectors. The external motorcycle shape determined by the location vectors which have been output can then be produced as a prototype, for example. The method for determining the external motorcycle shape is therefore concluded.

If the captured target property has not reached a predetermined value for the target property in step S21, a sensitivity landscape for the shape data record of the physical shape is determined in the third step S5.

The process of determining the sensitivity landscape for the shape data record in step S5 comprises determining sensitivity values for a plurality of locations at or on the physical shape on the basis of the shape data record. For a location at or on the physical shape, a sensitivity value indicates a degree of change for the change in the target property of the physical shape if the physical shape changes in the region of the location as a result of a change in the shape data record.

The sensitivity landscape determined for the shape data record is, for example, a surface sensitivity map for the physical shape. In this case, for locations on the surface of the physical shape, it indicates how the physical shape would have to be changed at these surface locations such that the target property of the physical shape changes in the direction of the predetermined value while repeatedly running through the method steps.

For example, for locations on the surface of the physical shape, the sensitivity landscape can indicate whether and to what extent the physical shape would have to be inwardly deformed ("pushed in") or outwardly deformed ("pulled out") in a normal direction at these locations in order to change the target property of the physical shape in the direction of the predetermined value while repeatedly running through the method steps. For example, a sensitivity value for a particular location at or on the physical shape is an absolute value and a sign of a normal vector at this location. For the particular location, the normal vector indicates how the target property, for example the flow resistance, changes if the physical shape is changed in the region of this location according to the absolute value and the direction, that is to say the sign, of the normal vector.

The sensitivity landscape is determined by calculating the sensitivity landscape with the aid of a machine-taught calculation device. A machine-taught calculation device is a device with artificial intelligence based on machine learning. Machine learning or artificial intelligence is the ability of computer-aided systems to use methods and solve problems which, when solved by a person, require intelligence. The use of the machine learning method to produce a calculation device or artificial intelligence can be carried out with the aid of a machine learning algorithm, for example a neural network.

In the example of determining the motorcycle shape, step S21 checks whether the flow resistance measured in the wind tunnel has reached the predetermined value for the flow resistance. If this is not the case, a surface sensitivity maps is determined for the location vectors of the external motorcycle shape in the third step S5.

The surface sensitivity map of the external motorcycle shape is calculated in step S5 with the aid of the taught calculation device 9' (AI device) on the basis of the location vectors of the external motorcycle shape. For the locations on the surface of the motorcycle shape which are defined by the location vectors, the surface sensitivity map respectively indicates how and to what extent the external motorcycle shape would have to be internally deformed ("pushed in") or externally deformed ("pulled out") in a normal direction at these locations in order to change the flow resistance of the external motorcycle shape in the direction of the predefined minimum value of the flow resistance while repeatedly running through the method steps. In this case, the surface sensitivity map comprises the location vectors and the sensitivity values associated with the location vectors. In this case, a sensitivity value for a particular location vector comprises an absolute value of a normal vector, which indicates the extent of the change which is needed to minimize the flow resistance, and a sign of the normal vector, which indicates the direction of the change.

The surface sensitivity map calculated in step S5 in the example of the motorcycle model 2' using the AI device 10' can be displayed on the basis of the location vectors describing the external motorcycle shape with the aid of the display device 5'. For example, the calculated surface sensitivity map can be presented on screens of the two augmented reality glasses 5' shown in such a manner that the surface sensitivity map appears to the wearers of the glasses 5' as having been projected onto the motorcycle model 2'. As a result, for the locations on the external shape of the motorcycle which are identified by the set of location vectors, the wearers of the augmented reality glasses 5' are provided with an item of direct information relating to how the external motorcycle shape would have to be changed in a respective normal direction in the region of these locations in order to minimize the flow resistance.

The external vehicle shape to be determined is generally an unknown external vehicle shape which corresponds to an unknown set of location coordinates. For this unknown external vehicle shape as an input data record, the taught AI device can calculate an associated surface sensitivity map as an output data record quickly and with little computational complexity. This is carried out, in particular, with considerably less computational complexity than in the case of complicated determination of the surface sensitivity map with the aid of a simulation which uses a simulation method.

In the next step S6, the shape data record of the physical shape is changed on the basis of the calculated sensitivity landscape. For example, the shape data record of the physical shape can be changed in such a manner that the physical shape is inwardly deformed at the locations for which the sensitivity landscape indicates inward deformation as advantageous. The extent of the inward deformation is based on the sensitivity landscape in this case. An advantageous change in the physical shape is in this case a change in the physical shape such that the predefined physical target property changes in the direction of the predetermined value. A corresponding situation applies to changing the shape data record of the physical shape with respect to outward deformation.

The shape data record changed in step S6 is provided as the shape data record of a physical shape as a new starting point for the method in a repeated step S1. The target property can change as a result of the change in the new physical shape described by the changed shape data record. A changed value for the target property is then captured in step S2.

If, after repeatedly running through steps S1 to S6 for a respectively changed shape data record and a target property newly captured for this in each case, the captured target property has reached the predetermined value for the target property in step S21, the shape data record available at this time is output in step S22, and so the method is concluded.

In the example of the external motorcycle shape, the set of location vectors describing the external motorcycle shape is changed on the basis of the surface sensitivity map calculated by the calculation device 9' (AI device), with the result that the flow resistance of the external vehicle shape changes in the direction of a minimum flow resistance.

Figure 2:
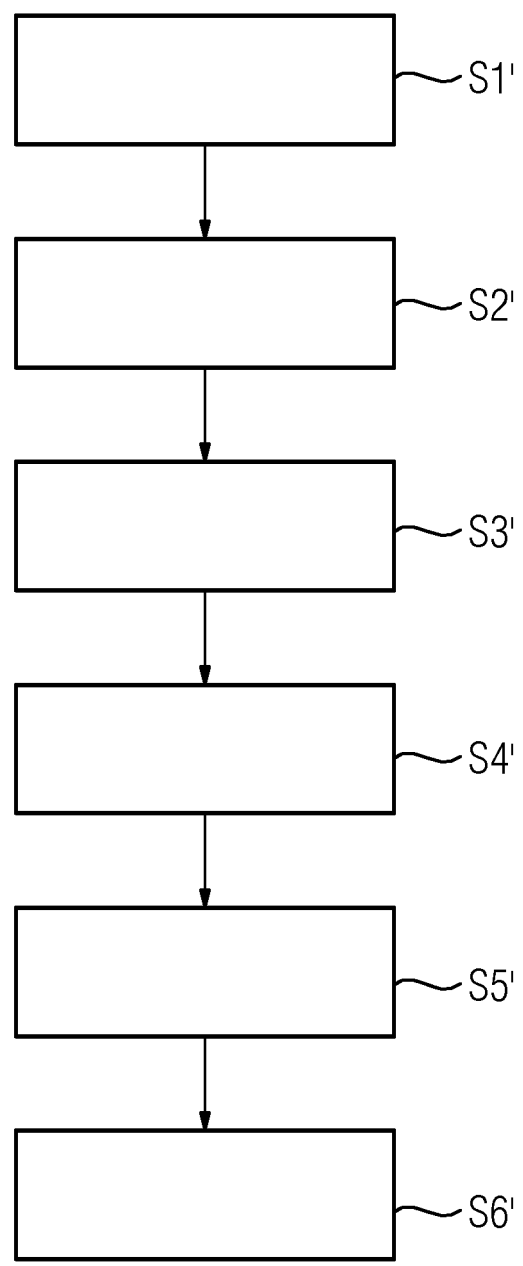
FIG. 2 shows a flowchart for an embodiment of a method for determining a physical shape having a predefined physical target property.

FIG. 2 shows a flowchart for a further embodiment of a method similar to the method from FIG. 1 for determining a physical shape having a predefined physical target property.

In step S1', a shape data record is created from shape data of a physical model. Step S1' corresponds to step S1 of the method described in connection with FIG. 1.

In the second step S2' of the method, a target property is captured for the physical shape which corresponds to the shape data record which has been created. Step S2' corresponds to step S2 of the method described in connection with FIG. 1.

In addition to steps S1, S2, S5 and S6 of the method from FIG. 1, the method in FIG. 2 comprises two further steps S3' and S4'.

In the third step S3' of the method from FIG. 2, a sensitivity landscape is determined for the shape data record. The sensitivity landscape comprises the shape data record and sensitivity values for a plurality of the locations at or on the physical shape which are identified by the shape data record. In particular, sensitivity values are therefore determined for a plurality of locations at or on the physical shape on the basis of the shape data record in the third step S3'. For a location at or on the physical shape, a sensitivity value indicates a degree of change for the change in the target property of the physical shape if the physical shape changes in the region of the location as a result of a change in the shape data record.

The sensitivity landscape can be determined by determining sensitivity values by means of a simulation method and/or by calculating sensitivity values by means of a machine-taught AI device. The sensitivity landscape is generated, in first runs of method steps S1' to S3' for example, with the aid of a simulation method and is generated, in the subsequent runs of method steps S1' to S3' for example, with the aid of a machine-taught AI device (calculation device).

As a result of the sensitivity landscape being determined on the basis of the shape data record, the sensitivity landscape can therefore be provided, for example, together with the shape data record as a learning data record for teaching the AI device in the next step S4'. In particular, the AI device can be machine-taught in the next step S4' by providing a plurality of shape data records and the sensitivity landscapes generated therefor, that is to say the plurality of learning data records.

One example of an implementation of the method from FIG. 2 is an improved determination of an external vehicle shape of a motorcycle with a minimum flow resistance with the aid of surface sensitivity maps by means of the apparatus illustrated in FIG. 8. Step S1' of generating the shape data record for the external motorcycle shape and step S2' of capturing the target property for the external motorcycle shape have already been described in the description of FIG. 1.

In the method in FIG. 2, two further steps S3' and S4' are carried out after step S2' before a step S5' corresponding to step S5 of the method from FIG. 1.

In step S3', a surface sensitivity map of the external motorcycle shape is calculated with the aid of a simulation method and/or with the aid of a taught AI device on the basis of the location vectors of the external motorcycle shape.

The surface sensitivity map of the external motorcycle shape is generated, in first passes of the method steps for example, with the aid of a simulation method which can be carried out, for example, by the simulation unit 11 of the computing apparatus 4'. In subsequent runs of the method steps for example, the surface sensitivity map of the external motorcycle shape is generated with the aid of the machine-taught calculation device 9'.

For the locations on the surface of the motorcycle shape which are defined by the location vectors, the surface sensitivity map respectively indicates how and to what extent the external motorcycle shape would have to be inwardly deformed ("pushed in") or outwardly deformed ("pulled out") in a normal direction at these locations in order to change the flow resistance of the external motorcycle shape in the direction of the predefined minimum value of the flow resistance while repeatedly running through the method steps. In this case, the surface sensitivity map comprises the location vectors and the sensitivity values associated with the location vectors. A sensitivity value for a particular location vector in this case comprises an absolute value of a normal vector, which indicates the extent of the change needed to minimize the flow resistance, and a sign of the normal vector, which indicates the direction of the required change.

As a result of the fact that the surface sensitivity map for the external motorcycle shape is determined on the basis of the location vectors which define the external motorcycle shape, the surface sensitivity map can therefore be provided together with the location vectors as a learning data record for teaching the AI device 9' in the next step S4'.

In the fourth step S4' of the method from FIG. 2, a machine learning method is used to produce a calculation device (AI device, artificial intelligence).

The use of the machine learning method to produce a calculation device or artificial intelligence is carried out with the aid of a machine learning algorithm. An artificial system (the calculation device) is taught with the aid of the algorithm on the basis of the plurality of shape data records and the sensitivity landscapes generated therefor, with the result that, after teaching, said system can also calculate an associated sensitivity landscape as an output data record for an unknown shape data record as an input data record.

For example, each of the plurality of shape data records forms a respective learning data record together with the sensitivity landscape generated therefor. The calculation device is taught on the basis of the plurality of learning data records with the aid of the machine learning algorithm. The learning data records are sample data records for teaching the calculation device.

The machine teaching can be carried out by classifying the plurality of learning data records in categories, recognizing patterns in the plurality of learning data records and generalizing recognized categories and patterns in order to be able to make predictions for unknown input data records. For example, it is possible to establish links between the plurality of learning data records in order to generate artificial shape data records and associated artificial sensitivity landscapes which enhance the shape data records and sensitivity landscapes of the learning data records.

In the example of the external motorcycle shape, the use of the machine learning method to produce the calculation device 9' is carried out with the aid of a neural network. The neural network of the AI device 9' is taught with the learning data records generated in step S3', each of which comprises a set of location vectors describing the external motorcycle shape and the associated surface sensitivity map. The respective learning data record can also comprise the flow resistance captured for the respective set of location coordinates in step S3'. As a result of the teaching, the AI device 9' can also calculate an associated surface sensitivity map as an output data record for an unknown set of location coordinates, which corresponds to an unknown external vehicle shape of the motorcycle, as an input data record. An unknown set of location coordinates is a set of location coordinates which is not provided during teaching.

The neural network can recognize regularities, repetitions and/or similarities in the plurality of learning data records. For example, the pattern that particular similar external shapes have a small flow resistance can be recognized in the plurality of learning data records. Furthermore, the pattern that particular similar external shapes have a large flow resistance can be recognized in the plurality of learning data records.

The neural network can establish links between the plurality of learning data records and, in this manner, can generate artificial location data records of the external shape of the motorcycle and associated artificial surface sensitivity maps. The artificial location data records and the associated artificial surface sensitivity maps enhance the learning data records.

In the fifth step S5' of the method from FIG. 2, a sensitivity landscape is calculated for a physical shape to be determined with the aid of the calculation device. Step S5' corresponds to step S5 of the method described in connection with FIG. 1.

In the sixth step S6' of the method from FIG. 2, the shape data record for the physical shape to be determined is changed on the basis of the calculated sensitivity landscape. The change is carried out in such a manner that the predefined target property changes in the direction of a predetermined value. Step S6' corresponds to step S6 of the method described in connection with FIG. 1.

Figure 3:
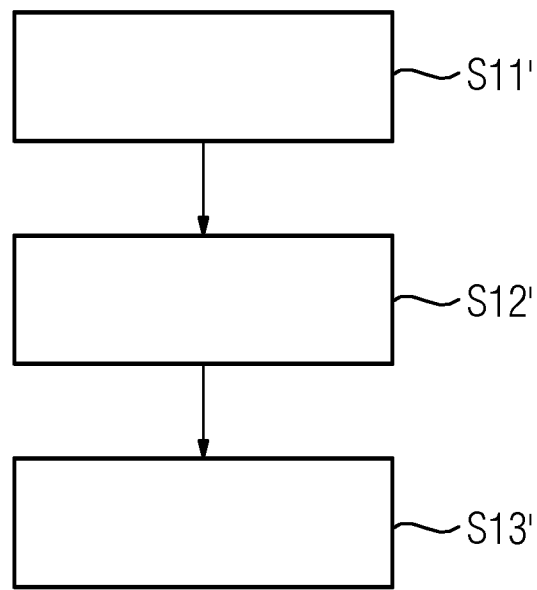
FIG. 3 shows a first variant for creating a shape data record.

FIG. 3 shows a first variant for creating the shape data record in step S1 of the method from FIG. 1 and in step S1' of the method from FIG. 2.

In this variant, step S1 or step S1' of creating the shape data record comprises the following substeps. In step S11', a physical model is provided. The physical model is a concrete physical model, for example a clay model. The physical model is, for example, the motorcycle model 2' from FIG. 8. In step S12', shape data are captured for this concrete physical model with the aid of a scanning device. The external shape of the motorcycle model 2' from FIG. 8 is captured with the aid of a 3-D scanner 3', for example. In step S13', a shape data record is generated for the captured shape data. The shape data record comprises location vectors, for example. The shape data record comprises, for example, location vectors which describe the external motorcycle shape.

Figure 4:
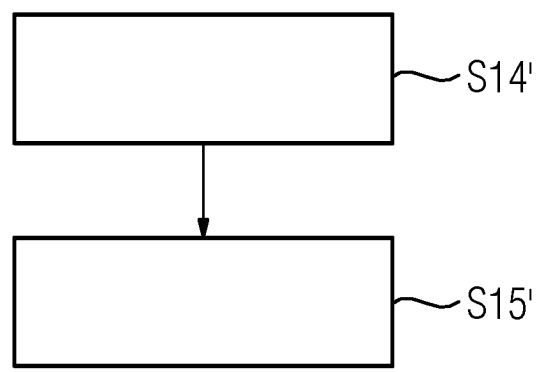
FIG. 4 shows a second variant for creating a shape data record.

FIG. 4 shows a second variant for creating the shape data record in step S1 of the method from FIG. 1 and in step S1' of the method from FIG. 2.

In the second variant, step S1 or step S1' of creating the shape data record comprises the following substeps. In step S14', shape data are provided for a physical model. For example, shape data are provided for a digitized physical model, for example a CAD model, in step S14'. In step S15', a shape data record is generated for the shape data which have been provided. The shape data record comprises location vectors, for example. The shape data record comprises, for example, location vectors which describe the external motorcycle shape.

Figure 5:
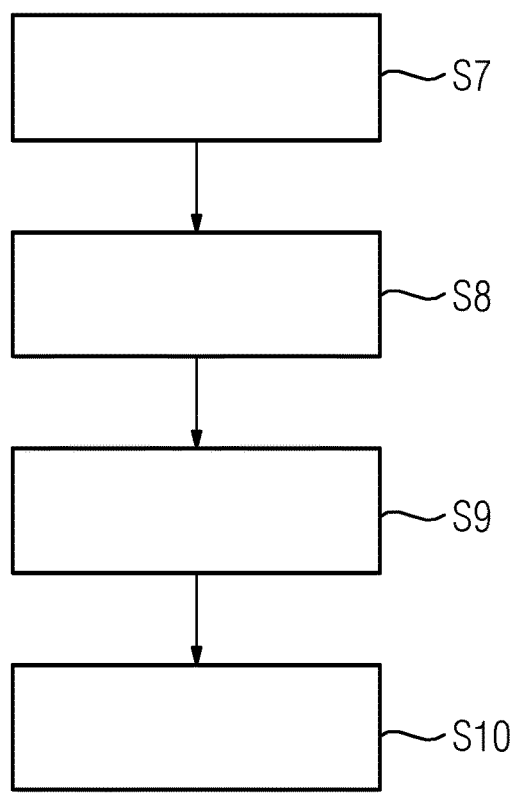
FIG. 5 shows a flowchart for an embodiment of a method for manufacturing a calculation device which calculates a sensitivity landscape from a shape data record.

FIG. 5 shows a flowchart for an embodiment of a method for manufacturing a calculation device which calculates a sensitivity landscape from a shape data record.

In the first step S7 of the manufacturing method, a basic AI device is provided. The basic AI device is a machine learning algorithm corresponding to the machine learning algorithm described in the description of step S4' from FIG. 2.

In the second step S8 of the manufacturing method, a learning data record is provided. The provision of the learning data record in step S8 corresponds to the generation of learning data record described in the description of step S4' from FIG. 2.

In the third step S9 of the manufacturing method, further learning data records are provided. The provision of further learning data records in step S9 corresponds to the generation of a plurality of learning data records described in the description of step S4' from FIG. 2.

In the fourth step S10 of the manufacturing method, a machine teaching method is used.

The method for the machine-teaching of the basic AI device which is used in step S10 to produce a taught AI device corresponds to the machine teaching method for producing a calculation device described with respect to step S4' from FIG. 2.

Alternatively, a calculation device can be produced with the aid of configuration data, wherein the configuration data are previously read from a taught AI device. A basic AI device is then configured with the configuration data and operates like an accordingly taught AI device.

FIG. 9 shows another example of a calculation of a sensitivity landscape from a shape data record with the aid of a machine-taught calculation device.

FIG. 9 illustrates an improved determination of a shape of a plate 36, on which forces F1, F2 (for example tensile forces, weight forces) act, with the aid of a machine-taught AI device. The shape of the plate 36 is intended to be changed in such a manner that it has a minimum weight or requires a minimum amount of material in order to mechanically withstand the predefined forces.

In this example, the physical shape is the plate 36. In this example, the predefined physical target property is the weight of the plate 36 or the amount of material needed for the plate 36. The weight of the plate 36 or the amount of material needed for the plate 36 is captured in the form of the density of the plate.

As described below, a learning data record is first of all generated for a plate 30 and an AI device is taught with the aid of this learning data record. The AI device taught in this manner is then used to determine the physical shape of the plate 36 with the aid of the AI device.

The learning data record is therefore first of all generated for the plate 30. In the case of the plate 30, the boundary conditions are that the plate 30 is fastened on its left-hand side 33, for example to a wall, and that forces Fx and Fy act on the plate, as shown on the left-hand side of FIG. 9. The force Fx which is directed to the left acts on the top right corner 31 of the plate 30. Furthermore, a force Fy which is directed downward acts on the bottom right corner 32 of the plate 30.

The physical shape of the plate 30 is intended to be improved in such a manner that the optimum physical shape which can mechanically withstand the acting forces Fx, Fy with a minimum weight or a minimum amount of material for the plate 30 is found.

In order to generate the learning data record, the structural strength of the plate 30 for the given boundary conditions is determined in a structural mechanics simulation. The result of the simulation for the density distribution D1 of the plate 30 can be seen at the bottom left in FIG. 9. In the illustration in FIG. 9, the density distribution D1 is represented, in a simplified manner and in a coarse resolution, by four regions of different density. The four regions of different density are represented by squares (pixels) G0, G1, G2, G3 which are hatched or marked differently. Black pixels G3 represent a high material density, densely hatched pixels G2 represent an average material density, broadly hatched pixels G1 represent a low material density, and white pixels G0 represent a material density of zero, that is to say no material. As can be seen in the density distribution D1 in FIG. 9, the plate 30 can still mechanically withstand the acting forces Fx, Fy even if material in the interior of the plate 30 is removed as long as individual material struts 34 of the plate 30 remain.

Said boundary conditions and the optimum shape of the plate 30 determined for the boundary conditions form a learning data record with the aid of which the AI device is taught.

In the next step, an optimum shape of a plate 36 is determined for an unknown input data record using the AI device taught in this manner. This is illustrated on the right-hand side of FIG. 9.

As shown on the right-hand side of FIG. 9, a force F1 which is directed to the bottom left acts on the top right corner 38 of the plate 36 which is fastened on its left-hand side 37. Furthermore, a force F2 which is directed to the top right acts on the bottom right corner 39 of the plate 36.

The shape of the plate 36 is again intended to be improved in such a manner that the optimum physical shape which can mechanically withstand the acting forces F1 and F2 with a minimum weight or a minimum amount of material for the plate 36 is found.

An improved shape of the plate 36 for these boundary conditions is determined with the aid of the taught AI device, as described with respect to the plate 30. The prediction of the taught AI device for the density distribution D3 of the plate 36 can be seen at the bottom right of FIG. 9. As described above for the density distribution D1, the density D3 of the material of the plate 36 is represented by means of pixels which are hatched or marked differently.

For comparison, the applicant carried out structural-mechanical simulations. The result of a structural mechanics simulation for the density distribution D2 of the plate 36 for the given boundary conditions can be seen on the right in the center of FIG. 9. A comparison of the optimum shape predicted by the AI device (density distribution D3) and the optimum shape calculated by the structural mechanics simulation (density distribution D2) for the plate 36 shows that the prediction of the AI device is very similar to the result of the structural mechanics simulation. That is to say, the shape of the plate 36 can be determined by the taught AI device very well in comparison with a simulation calculation and with much less computational complexity than in the simulation calculation.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for determining a physical shape having a predefined physical target property, the method comprising:
providing a physical model, and either capturing shape data for the physical model or providing the shape data of the physical model for respectively creating a shape data record which identifies locations at or on a physical shape which corresponds to the shape data;
capturing the predefined physical target property for the physical shape which corresponds to the shape data record;
determining sensitivity values for the locations at or on the physical shape on a basis of the shape data record for generating a sensitivity landscape for a respective shape data record, wherein, for a location at or on the physical shape, a sensitivity value indicates a degree of change for a change in the predefined physical target property of the physical shape if the physical shape changes in a region of the location as a result of a change in the shape data record;
using a machine learning method to produce a calculation device which assigns the sensitivity landscape to the respective shape data record, wherein the machine learning method is carried out on a basis of a plurality of shape data records, target properties, or the sensitivity values;
calculating a sensitivity landscape on a basis of a shape data record for a physical shape to be determined with an aid of the calculation device; and
changing the shape data record for the physical shape to be determined on the basis of the calculated sensitivity landscape in such a manner that the predefined physical target property changes in a direction of a predetermined value.

2. The method as claimed in claim 1, wherein the physical shape is a volume, a two-dimensional geometrical shape, a three-dimensional geometrical shape, a vehicle shape, a shape of a structural element, a shape of a fastening element and/or a three-dimensional shape of a surface structure.

3. The method as claimed in claim 1, wherein the capturing the shape data for the physical model comprises: scanning with an aid of a scanning device, with an aid of cameras, laser beams, radar waves and/or ultrasonic waves.

4. The method as claimed in claim 1, wherein the shape data includes: computer-aided-design data, surface shape data, standard shape data, ruled surface data, grid data, grid structure data, data relating to parameterized free-form surfaces and/or facet data.

5. The method as claimed in claim 1, wherein the capturing the predefined physical target property comprises: measuring the predefined physical target property by measuring a flow resistance in a wind tunnel, measuring a structural strength, a temperature, a reflection property at a surface, a weight, a conductivity and/or sound absorption of a surface structure.

6. The method as claimed in claim 1, wherein the capturing the predefined physical target property comprises a simulation method for simulating the predefined physical target property on the basis of the shape data record.

7. The method as claimed in claim 6, wherein the simulation method comprises: a mathematical simulation method, a numerical simulation method, a space discretization method, a surface discretization method, a finite elements method, a finite differences method, a finite volume method, a particle-based method, a computational continuum mechanics method and/or a computational fluid dynamics method.

8. The method as claimed in claim 1, wherein the capturing the predefined physical target property is carried out taking into account captured boundary conditions, wherein the captured boundary conditions stipulate ranges of values for which the predefined physical target property is measured and/or simulated, and wherein the captured boundary conditions comprise a wind direction, a wind strength, a wind tunnel configuration, a weight, a structural strength, a sound frequency and/or a sound power.

9. The method as claimed in claim 1, wherein each shape data record is assigned the predefined physical target property and/or the sensitivity values captured for the machine learning method to generate a respective learning data record.

10. The method as claimed in claim 9, further comprising generating and storing a plurality of learning data records.

11. The method as claimed in claim 9, wherein the using a machine learning method comprises teaching/training a neural network, with the aid of a plurality of learning data records which have been generated.

12. The method as claimed in claim 1, wherein the respective shape data record comprises the locations on or at the surface of the physical shape in the form of location data records, and wherein a sensitivity value for a location data record defining a predetermined location indicates a degree of change for the change in the predefined physical target property if the physical shape changes in a normal direction at the predetermined location.

13. The method as claimed in claim 1, wherein a respective sensitivity landscape comprises a shape data record and a degree of change for the change in the predefined physical target property of the physical shape if the physical shape changes in a respective normal direction at a plurality of the locations at or on the physical shape, which are identified by the shape data record, as a result of a change in the shape data record.

14. The method as claimed in claim 1, wherein the following steps are repeatedly carried out in succession:
changing the shape data record for the physical shape to be determined, and calculating a sensitivity landscape on the basis of the shape data record with the aid of the calculation device for the purpose of changing the physical shape.

15. The method as claimed in claim 1, wherein the calculation device comprises an assignment table which assigns a respective sensitivity landscape to a plurality of shape data records.

16. The method as claimed in claim 1, further comprising displaying the calculated sensitivity landscape on the basis of the shape data record.

17. The method as claimed in claim 16, wherein the displaying comprises: spatially displaying the calculated sensitivity landscape on the basis of the shape data record on the physical model and/or displaying the calculated sensitivity landscape on the basis of the shape data record in such a manner that the calculated sensitivity landscape is displayed together with the shape data record.

18. The method as claimed in claim 1, further comprising producing a physical shape having the predefined physical target property according to the shape data record which has been changed on the basis of the calculated sensitivity landscape.

19. The method as claimed in claim 18, wherein the producing the physical shape comprises an additive manufacturing method with an aid of a strand of quick-setting compound.

20. The method as claimed in claim 1, wherein the predefined physical target property is a flow resistance, a strength, a temperature, a reflection property at a surface, a weight, a conductivity and/or sound absorption of a surface structure.

21. The method as claimed in claim 1, wherein the respective shape data record comprises the locations on or at a surface of the physical shape in a form of location data records.

22. The method as claimed in claim 1, wherein the calculation device comprises a neural network.

23. The method as claimed in claim 1, wherein the calculation device is set up to carry out pattern recognition on shape data records and to output sensitivity values and/or a sensitivity landscape.

24. A method for manufacturing a calculation device for calculating a sensitivity landscape from a shape data record, the method comprising:
providing a basic artificial intelligence (AI) device which is a device with artificial intelligence based on machine learning and which maps an input data record to an output data record;
providing the shape data record and associated sensitivity values, wherein the shape data record and the associated sensitivity values together form a learning data record,
wherein the shape data record identifies locations at or on a physical shape,
wherein the associated sensitivity values indicate, for the locations at or on the physical shape, a degree of change for a change in a physical target property of the physical shape if the physical shape changes in a region of a location as a result of a change in the shape data record, and
wherein a sensitivity landscape comprises the sensitivity values assigned to the locations in the shape data record;
providing further different learning data records; and
subjecting the basic AI device to machine teaching with an aid of the learning data records in order to generate a taught AI device as the calculation device.

25. A calculation device manufactured according to a method as claimed in claim 24.

26. The calculation device as claimed in claim 25, wherein the calculation device calculates the sensitivity landscape from a shape data record, wherein the sensitivity landscape is provided for the purpose of adapting a physical shape to be determined in such a manner that the physical target property changes in a direction of a predetermined value.

27. An apparatus for determining a physical shape having a predefined physical target property, comprising:
a capture device for generating a shape data record for the physical shape, in which the shape data record identifies locations at or on the physical shape;
a calculation device for calculating a sensitivity landscape from the shape data record, wherein:
the sensitivity landscape comprises the shape data record and a degree of change for a change in the predefined physical target property of the physical shape if the physical shape changes in a respective normal direction at the locations at or on the physical shape which are identified by the shape data record;
the calculation device is an artificial intelligence apparatus which is taught on a basis of machine learning and maps the shape data record as an input data record to the sensitivity landscape as an output data record,
the machine learning is carried out on a basis of a plurality of learning data records,
each learning data record comprises a learning shape data record for a learning physical shape and a learning sensitivity landscape as a degree of change for a change in a target property of the learning physical shape if the learning physical shape changes in a respective normal direction at locations at or on the learning physical shape which are identified by the learning shape data record; and
a display device for displaying the sensitivity landscape on the basis of the shape data record.

28. The apparatus as claimed in claim 27, further comprising a storage device for storing the sensitivity landscape on the basis of the shape data record.

29. The apparatus as claimed in claim 27, wherein the physical shape having the predefined physical target property is produced with an aid of a strand of quick-setting compound during additive manufacturing.

* * * * *